United States Patent
Watanabe (10) Patent No.: US 9,560,007 B2
(45) Date of Patent: Jan. 31, 2017

(54) SERVER APPARATUS, INFORMATION PROCESSING SYSTEM, ADDRESS MANAGEMENT METHOD OF SERVER APPARATUS

(71) Applicant: FUJITSU LIMITED, Kawasaki-shi, Kanagawa (JP)

(72) Inventor: Hiroshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 14/300,274

(22) Filed: Jun. 10, 2014

(65) Prior Publication Data

US 2014/0289365 A1     Sep. 25, 2014

Related U.S. Application Data

(63) Continuation of application No. PCT/JP2012/050624, filed on Jan. 13, 2012.

(51) Int. Cl.
*H04L 29/12*    (2006.01)

(52) U.S. Cl.
CPC ............. *H04L 61/10* (2013.01); *H04L 61/103* (2013.01); *H04L 61/2046* (2013.01); *H04L 61/6009* (2013.01); *H04L 61/2015* (2013.01)

(58) Field of Classification Search
CPC .... H04L 61/10; H04L 61/103; H04L 61/2046; H04L 61/6009; H04L 61/2015
See application file for complete search history.

(56) References Cited

U.S. PATENT DOCUMENTS

| 8,903,991 B1* | 12/2014 | Panin | H04L 43/0811 |
| | | | 709/224 |
| 2002/0075836 A1* | 6/2002 | Uematsu | H04L 29/12216 |
| | | | 370/338 |

(Continued)

FOREIGN PATENT DOCUMENTS

| JP | 2004-364190 | 12/2004 |
| JP | 2007-150936 | 6/2007 |
| JP | 2008-109379 | 5/2008 |

OTHER PUBLICATIONS

Droms, Dynamic Host Configuration Protocol, Mar. 1997, IETF Network Working Group, Request for Comments: 2131.*

(Continued)

*Primary Examiner* — Wing F Chan
*Assistant Examiner* — Billy H Ng
(74) *Attorney, Agent, or Firm* — Fujitsu Patent Center (57) ABSTRACT

A server apparatus includes a storage unit to store table data including an IP address and a MAC address of each of information processing apparatuses connected to a network, the IP address and the MAC address being associated with each other in the table data; and a processor to transmit information having one of the IP addresses specified, and to update the table data based on information in a reply for the transmitted information, to determine whether the MAC address being associated with the IP address has been changed since a time-out possibly occurring while receiving or transmitting the information with the information processing apparatus, and to issue a command for freezing the corresponding IP address on use to an IP address assignment apparatus connected to the network if the MAC address has been changed.

5 Claims, 9 Drawing Sheets (56) References Cited

U.S. PATENT DOCUMENTS

| | | | |
|---|---|---|---|
| 2005/0007962 A1* | 1/2005 | Nam | H04L 29/12018 370/252 |
| 2006/0129695 A1* | 6/2006 | Faibish | H04L 29/12009 709/245 |
| 2009/0154394 A1* | 6/2009 | Park | H04W 76/021 370/328 |

OTHER PUBLICATIONS

Manabu Takata et al., "Imadoki no Net o Rikai suru; 7-tsu no Juyo Keyword", p. 109, 'Saigo ni Chofuku shite Inaika Kakunin', Fig. 2, Nikkei Network, No. 32, pp. 104-119, Dec. 2002, Partial English Translation.

International Search Report, mailed in connection with PCT/JP2012/050624 and mailed Mar. 13, 2012.

* cited by examiner

| IP ADDRESS | MAC ADDRESS | UPDATE DATE AND TIME |
|---|---|---|
| 10.0.0.1 | 00-16-D3-D8-28-87 | 2011/08/04 23:30:06 |
| 10.0.0.2 | 00-16-D3-D8-28-87 | 2011/08/04 23:50:16 |
| 10.0.0.3 | 00-16-D3-D8-28-81 | 2011/08/04 03:15:01 |
| | | |
| | | |

| IP ADDRESS | MAC ADDRESS | EXPIRATION DATE AND TIME | FROZEN ON USE |
|---|---|---|---|
| 10.0.0.1 | 00-16-D3-D8-28-87 | 2011/08/04 23:30:06 | TRUE |
| 10.0.0.2 | 00-16-D3-D8-28-87 | 2011/08/04 23:50:16 | FALSE |
| 10.0.0.3 | 00-16-D3-D8-28-81 | 2011/08/04 03:15:01 | FALSE |
|  |  |  |  |
|  |  |  |  |

| IP ADDRESS |
|---|
| 10.0.0.11 |
| 10.0.0.12 |
| 10.0.0.13 |
|  |
|  |

FIG.10

SERVER APPARATUS, INFORMATION PROCESSING SYSTEM, ADDRESS MANAGEMENT METHOD OF SERVER APPARATUS

CROSS-REFERENCE TO RELATED APPLICATIONS

This application is a continuation application of International Application PCT/JP2012/050624 filed on Jan. 13, 2012 and designated the U.S., the entire contents of which are incorporated herein by reference.

FIELD

The disclosures herein generally relate to a server apparatus, an information processing system, and an address management method of a server apparatus.

BACKGROUND

Conventionally, a switching hub device has been known that has a function to detect duplication of an IP address, by receiving data at ports to obtain IP addresses of respective devices connected at the ports, and by recording correspondences between the ports and the IP addresses set to the devices connected at the ports.

The switching hub device has a function that obtains an alternative IP address that is not being used for the devices connected at the ports if detecting duplication of an IP address, and assigns the alternative IP address to the port at which the duplication of the IP address is detected. The switching hub device also has a function that if the port having the alternative IP address assigned receives data, the function converts the IP address of the source device that transmits the data to the alternative IP address assigned to the reception port. The switching hub device also has a function that if transmitting data to the port having the alternative IP address, the function converts the destination IP address of transmission data to the IP address corresponding to the transmission port.

RELATED-ART DOCUMENTS

Patent Documents

[Patent Document 1] Japanese Laid-open Patent Publication No. 2007-150936

However, conventional technologies cannot resolve duplication of an IP address if the duplication occurs with devices that are connected with a network without a switching hub described above.

SUMMARY

According to at least one embodiment of the present invention, a server apparatus includes a storage unit to store table data including an IP address and a MAC address of each of information processing apparatuses connected to a network, the IP address and the MAC address being associated with each other in the table data; and a processor to transmit information having one of the IP addresses specified, and to update the table data based on information in a reply for the transmitted information, to determine whether the MAC address being associated with the IP address has been changed since a time-out possibly occurring while receiving or transmitting the information with the information processing apparatus, and to issue a command for freezing the corresponding IP address on use to an IP address assignment apparatus connected to the network if the MAC address has been changed.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

In the following, embodiments of the present invention will be described with reference to the accompanying drawings.

Embodiments

In the following, with reference to the drawings, a server apparatus, an information processing system, and an address management method of a server apparatus will be described according to an embodiment of the present invention.

Configuration

Figure 1:
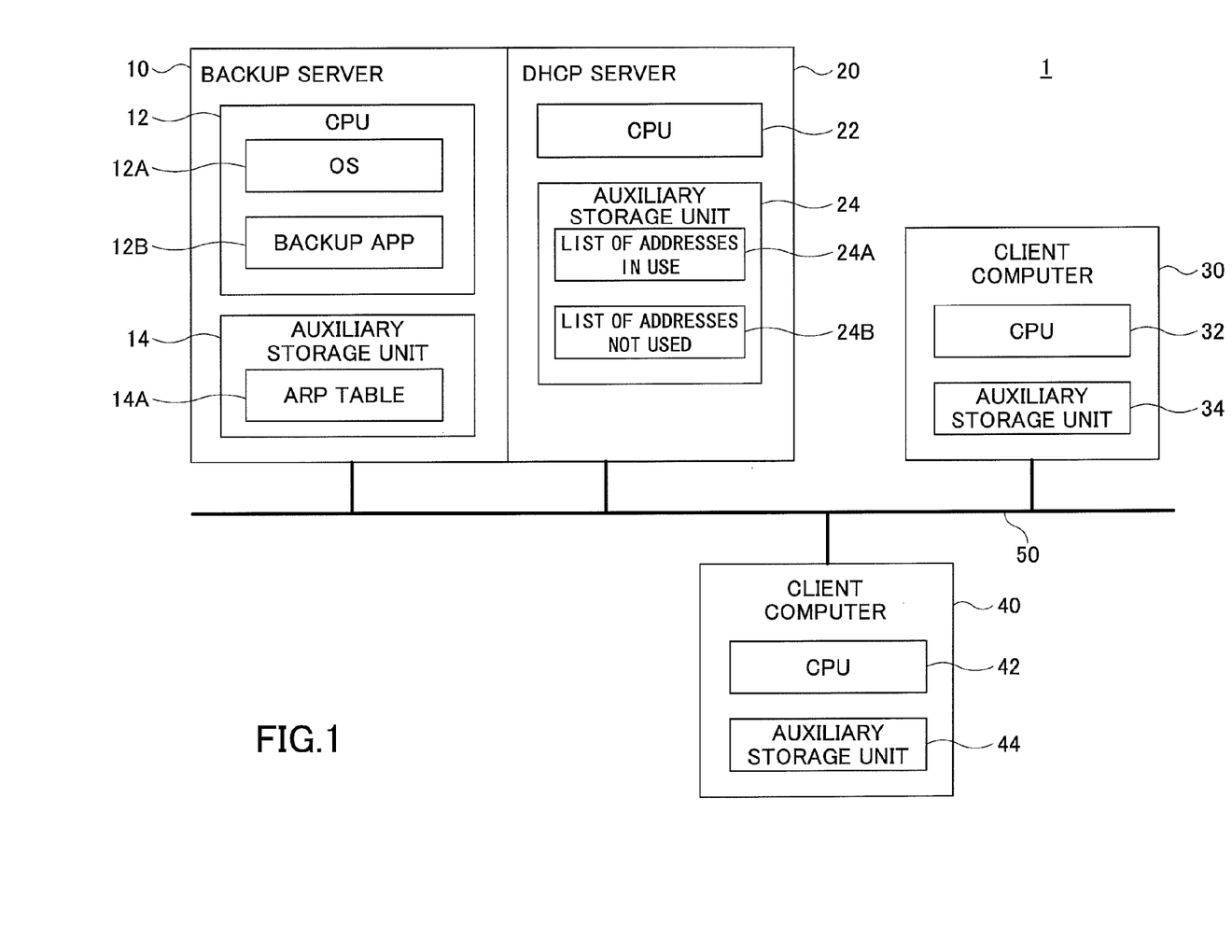
FIG. 1 is a schematic view illustrating an example of a system configuration of an information processing system 1 according to an embodiment of the present invention.

FIG. 1 is a schematic view illustrating an example of a system configuration of an information processing system 1 according to the present embodiment. The information processing system 1 includes, as main elements, a backup server 10, a DHCP (Dynamic Host Configuration Protocol) server 20, and client computers 30-40. The backup server 10 and the DHCP server 20 may be multiple functions of a physical server, or may be distinct physical servers.

The backup server 10, the DHCP server 20, the client computers 30-40 are connected with each other via a network 50. On the network 50, packet communication is executed based on, for example, TCP/IP (Transmission Control Protocol/Internet Protocol).

The backup server 10 and the DHCP server 20 include CPUs (Central Processing Unit) 12 and 22 that execute programs, respectively. The backup server 10 and the DHCP server 20 also include auxiliary storage units 14 and 24, respectively, such as HDDs or flash memories.

The backup server 10 and the DHCP server 20 also include memory units such as RAM (Random Access Memory, not illustrated), and communication units such as NIC (Network Interface Card, not illustrated), respectively. If the backup server 10 and the DHCP server 20 are functions executed by a single physical processor, the CPU and the auxiliary storage unit may be shared. In this case, time-sharing multi-processing is executed. Programs executed by the backup server 10 and the DHCP server 20 may be obtained via the network 50, or may be installed on the auxiliary storage units 12-22 by attaching a portable memory.

The client computer 30 includes a CPU 32, an auxiliary storage unit 34, a memory unit, and a communication unit. Similarly, the client computer 40 includes a CPU 42, an auxiliary storage unit 44, a memory unit, and a communication unit. Although only one client computer 30 is illustrated in FIG. 1, there may be multiple client computers 30.

The backup server 10 provides a backup service for the client computer 30. The backup server 10 includes an OS (Operating System) 12A and a backup application 12B as functional blocks that work when the CPU 12 executes a program. The backup service is implemented by the backup application 12B. The client computer 30 transmits a part of or all of data stored in the auxiliary storage unit 34 to the backup server 10 when the client computer 30 is activated. The backup server 10 stores the data received from the client computer 30 in the auxiliary storage unit 14, and transmits the data stored in the auxiliary storage unit 14 to the client computer 30 at appropriate timing. An "update unit" in the claims of the present invention corresponds to, for example, the OS 12A, and an "instruction unit" in claims corresponds to, for example, the backup application 12B.

The backup server 10 holds an ARP table 14A in which the IP address and the MAC address of each device connected with the network 50 are associated with each other, and the ARP table 14A is stored in the auxiliary storage unit 14 (alternatively, the ARP table 14A may be stored in a RAM).

The DHCP server 20 holds a list of addresses in use 24A and a list of addresses not used 24B in the auxiliary storage unit 24 (alternatively, these lists may be stored in a RAM).

The client computer 30 executes communication with the backup server 10 using an IP address obtained from the DHCP server 20. On the other hand, the client computer 40 executes a communication using a fixed IP address. Therefore, if the client computer 40 makes a connection with the network 50 while the client computer 30 executes a communication using an IP address obtained from the DHCP server 20, duplication of the IP address may occur between the client computers 30 and 40. To resolve such duplication of an IP address, the information processing system 1 executes the following processes according to the present embodiment. In the following, the processes executed by the respective elements will be described in order.

[Process Executed when Client Computer 30 is Activated]

Figure 2:
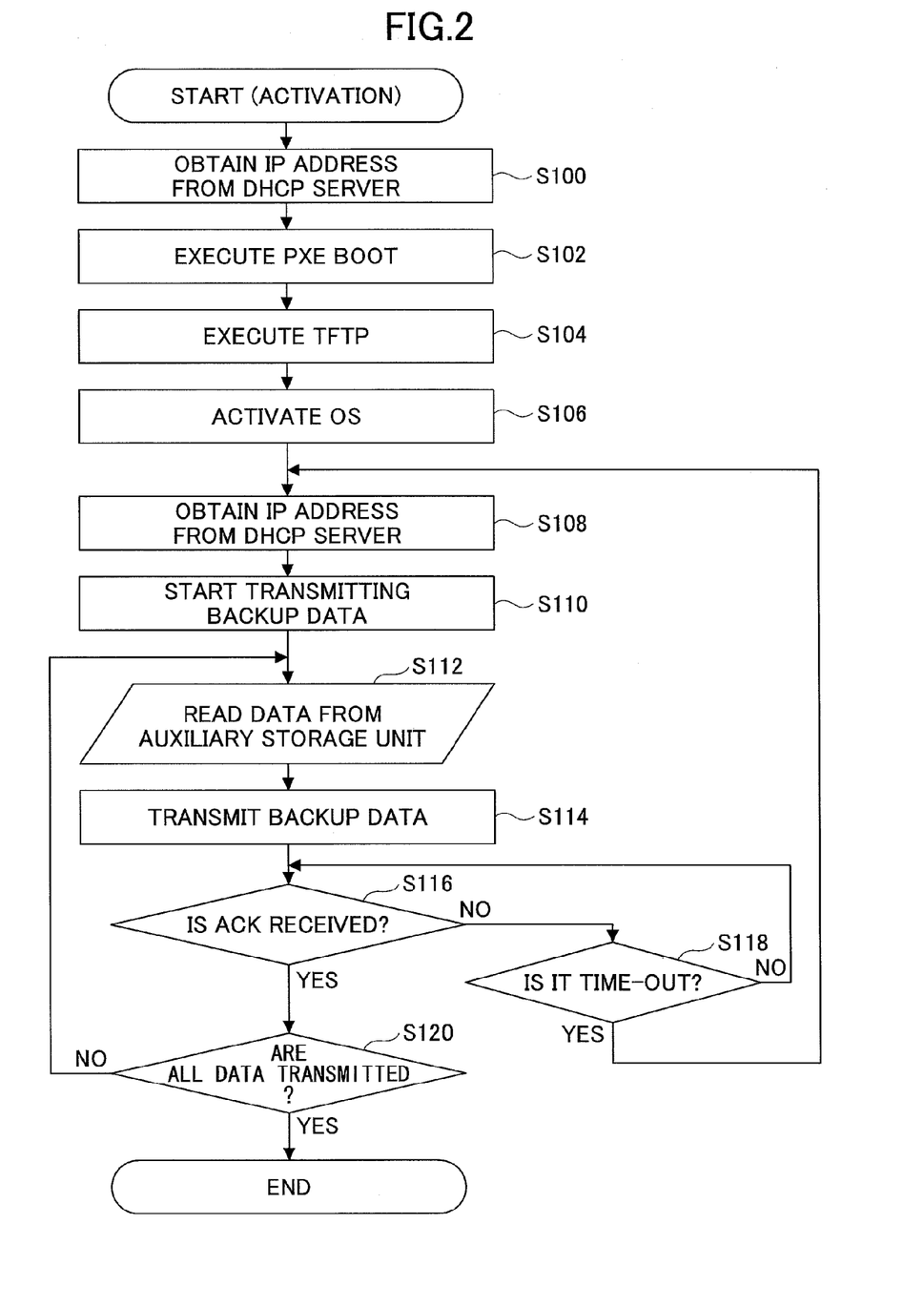
FIG. 2 is an example of a flowchart illustrating a process executed when a client computer 30 is activated.

FIG. 2 is an example of a flowchart illustrating the process executed when the client computer 30 is activated.

First, the client computer 30 executes Steps S100-S104 under control of a BIOS (Basic Input/Output System, not illustrated).

The client computer 30 obtains an IP address from the DHCP server 20 (Step S100). Next, the client computer 30 executes a PXE (Preboot Execution Environment) procedure (Step S102). Next, the client computer 30 executes a TFTP (Trivial File Transfer Protocol) (Step S104) to obtain an OS code from the backup server 10.

Next, the client computer 30 activates an OS (not illustrated) (Step S106). When the OS is activated, the client computer 30 executes Steps S108-S120 under control of the OS.

The client computer 30 obtains an IP address from the DHCP server 20 (Step S108).

Next, the client computer 30 starts transmitting backup data (Step S110). When starting the transmission, for example, a start indication signal is transmitted to the backup server 10 for indicating the start of the transmission of backup data.

Once the transmission of backup data is started, the client computer 30 reads data (Step S112). Specifically, the client computer 30 reads a predetermined unit of data stored in the auxiliary storage unit 34 (for example, data that can be contained in a packet), loads the data in the RAM, and transmits the data to the communication unit such as a NIC.

Next, the client computer 30 has the communication unit transmit the backup data to the backup server 10 (Step S114).

After having transmitted the backup data, the client computer 30 determines whether it receives an ACK signal from the backup server 10 that indicates reception of the backup data (Step S116). If not receiving the ACK signal, the client computer 30 determines whether a time-out occurs, namely, determines whether a predetermined time has passed since the start of the data transmission at Step S114 (Step S118). If a time-out has not occurred, the client computer 30 goes back to Step S116.

If having received the ACK signal before a time-out, the client computer 30 determines whether all data to be backed up has been transmitted (Step S120). If all data to be backed up has not been transmitted, the client computer 30 goes back to Step S112 to read a next unit of data. If all data to be backed up has been transmitted, the client computer 30 ends the process of the flowchart.

On the other hand, if a time-out occurs before receiving the ACK signal, the client computer 30 goes back to Step S108 to obtain an IP address from the DHCP server 20.

With the above process, if duplication of an IP address occurs when the client computer 40 makes a connection, the client computer 30 can obtain another IP address, as will be described later.

[Update Process of ARP Table 14A]

Figure 3:
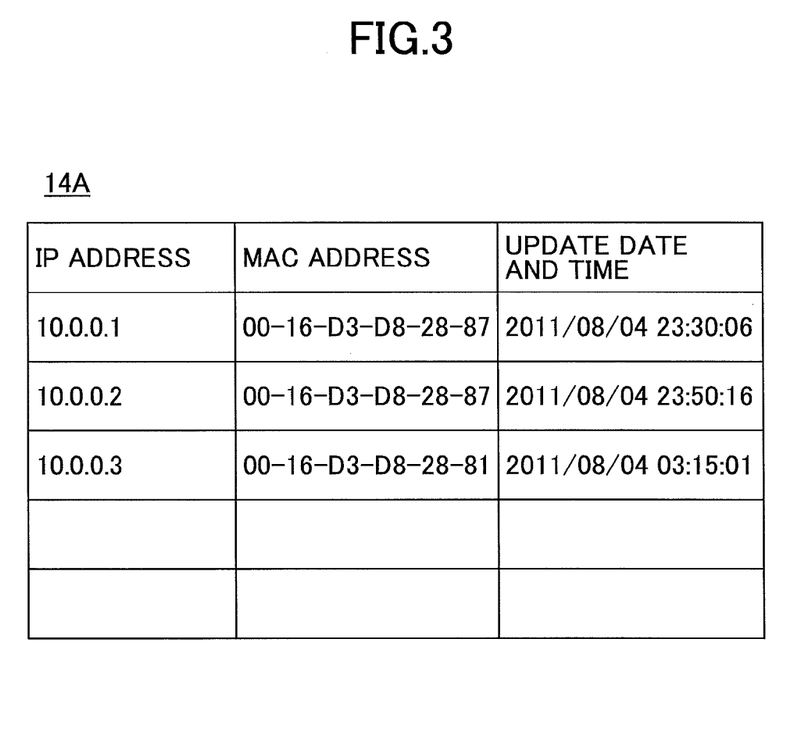
FIG. 3 is an example of data stored as an ARP table 14A.

The backup server 10 executes an update process of an ARP table 14A at predetermined timing. The update process of an ARP table 14A is executed under control of the OS 12A. FIG. 3 is an example of data stored as an ARP table 14A. When an "update date and time" associated with one of the IP addresses comes, the backup server 10 updates fields of data (a record of data) in the ARP table 14A that are associated with the update date and time of the IP address.

Figure 4:
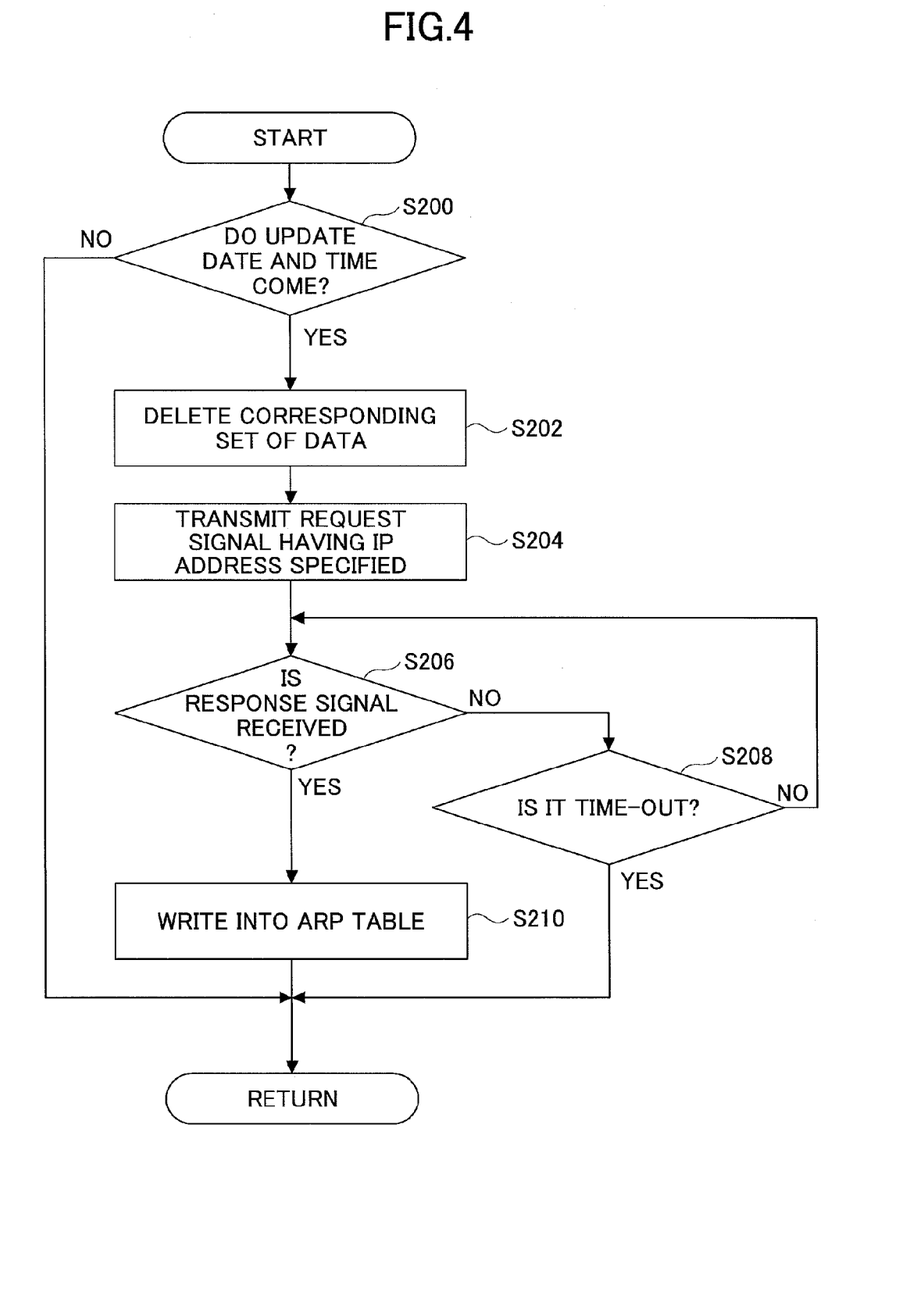
FIG. 4 is an example of a flowchart illustrating an update process of an ARP table 14A executed by an OS 12A of a backup server 10.

FIG. 4 is an example of a flowchart illustrating the update process of the ARP table 14A executed by the OS 12A of the backup server 10. The flowchart is repeatedly executed, for example, at predetermined cycles.

First, the OS 12A determines whether the update date and time have come for any of the IP addresses stored in the ARP table 14A (Step S200). If there is no IP address whose update date and time have come, the OS 12A ends the process of the flowchart.

If there is an IP address whose update date and time have come, the OS 12A deletes the record of data that corresponds to the IP address whose update date and time have come (Step S202). Before deleting the data, the OS 12A saves the IP address to the RAM for using it later at Steps S204 and after.

Next, the OS 12A generates a request signal in which the IP address whose update date and time have come (simply referred to as the "corresponding IP address" below) is specified, and transmits the request signal for requesting a reply of the MAC address, to devices connected with the network 50 (Step S204).

After having transmitted the request signal, the OS 12A determines whether a response signal is received from one of the devices connected with the network 50 (Step S206). If not receiving the response signal, the OS 12A determines whether a time-out occurs, namely, determines whether a predetermined time has passed after having transmitted the request signal at Step S204 (Step S208). If not receiving the response signal and a time-out does not occur, the OS 12A goes back to Step S206 to continue the process.

If receiving the response signal before a time-out, the OS 12A writes a combination of the corresponding IP address and the MAC address included in the response signal into the ARP table 14A (Step S210). At the same time, the OS 12A sets a new update date and time.

On the other hand, if not receiving the response signal and a time-out occurs, the OS 12A determines that a device having the corresponding IP address assigned does not exist in the network 50, and ends the process of the flowchart.

Figure 5:
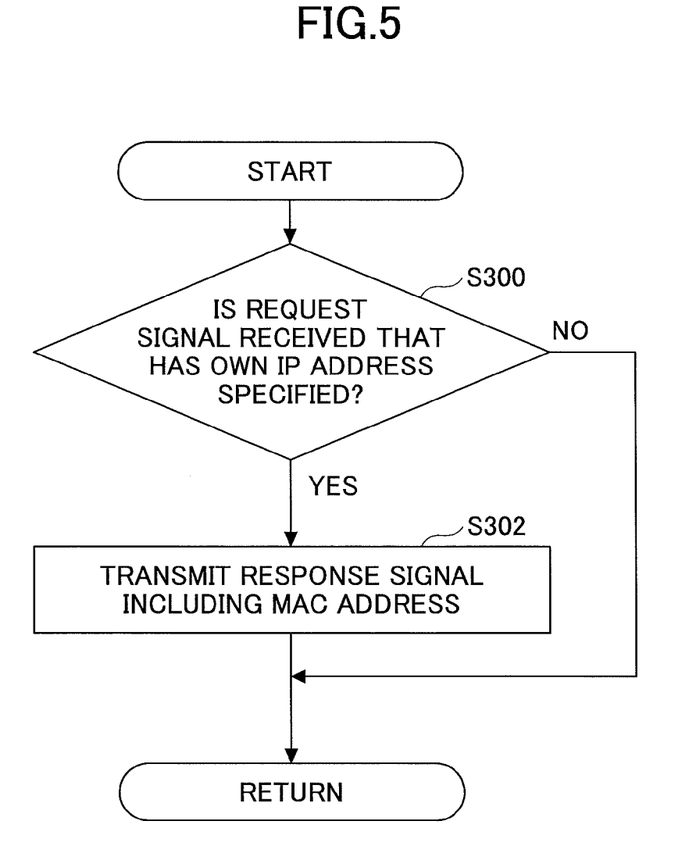
FIG. 5 is an example of a flowchart illustrating a process executed on a client computer 30, which corresponds to an update process of an ARP table 14A on a backup server 10.

FIG. 5 is an example of a flowchart illustrating a process executed on the client computer 30, which corresponds to the update process of the ARP table 14A on the backup server 10. The flowchart is repeatedly executed, for example, at predetermined cycles.

The client computer 30 (or 40) determines whether it receives a request signal having its own IP address specified, which has been obtained from the DHCP server 20 (Step S300). If receiving the request signal having its own IP address specified, the client computer 30 (or 40) transmits a response signal having its own MAC address included to the backup server 10 (Step S302).

[Reception Process of Backup Data on Backup Server 10]

When receiving a start indication signal of transmission of backup data (refer to the description of Step S110 in FIG. 2), the backup application 12B is activated on the backup server 10 to start receiving the backup data from the client computer 30.

Figure 6:
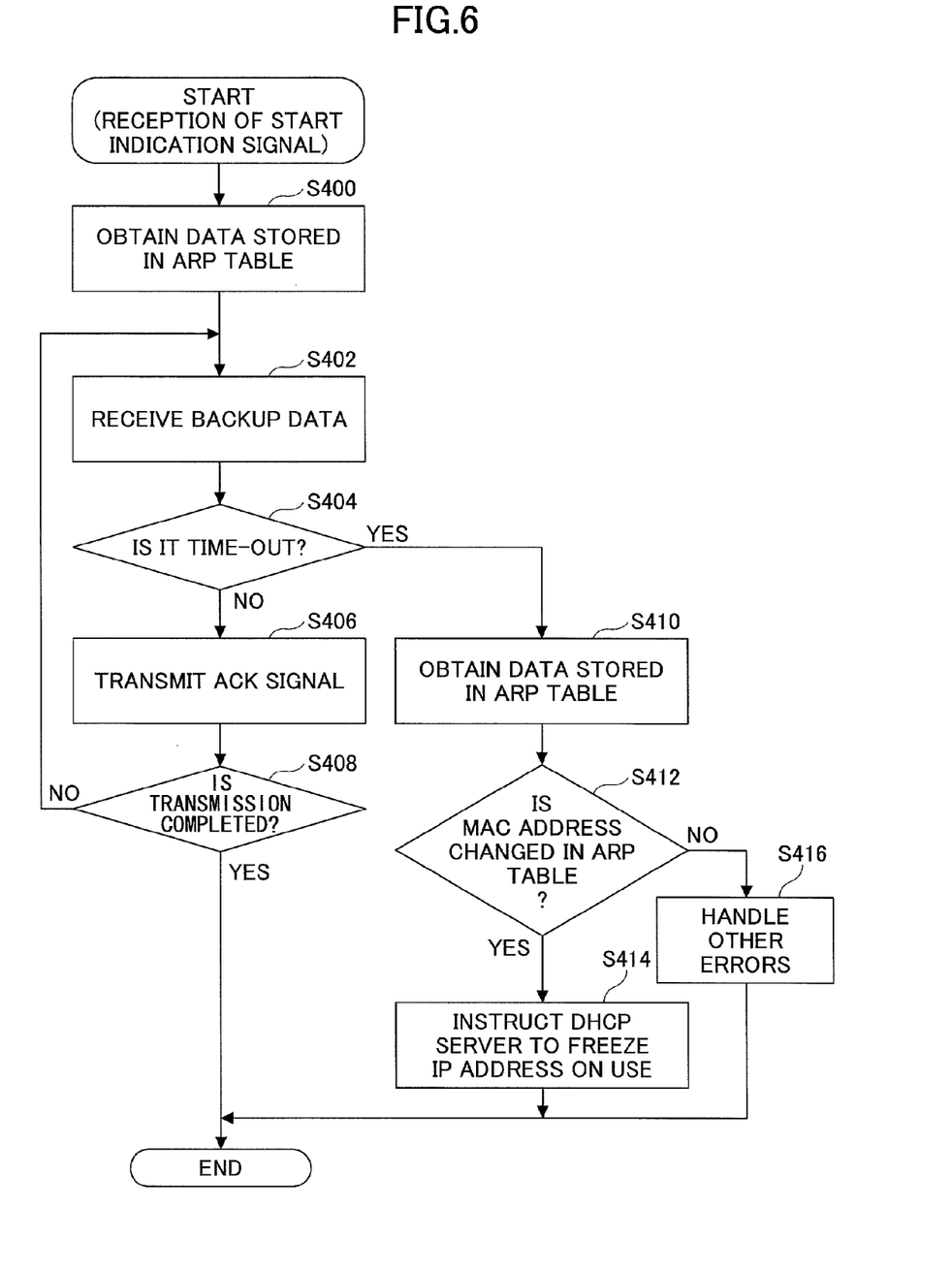
FIG. 6 is an example of a flowchart illustrating a reception process of backup data executed by a backup application 12B on a backup server 10.

FIG. 6 is an example of a flowchart illustrating a reception process of backup data executed by the backup application 12B on the backup server 10. The flowchart is started when a start indication signal is received from the client computer 30.

First, the backup application 12B obtains data stored in the ARP table 14A, and stores correspondences between IP addresses and MAC addresses in the RAM (not illustrated) (Step S400).

Next, the backup application 12B receives backup data from the client computer 30 (Step S402), and determines whether a time-out occurs, namely, determines whether a predetermined time has passed since the start of the flowchart (Step S404).

If a time-out does not occur, the backup application 12B controls the communication unit to transmit an ACK signal to the client computer 30 upon completion of receiving a predetermined unit of backup data (Step S406).

Note that the transmission at Step S406 is executed by the backup application 12B that makes a transmission request to the OS 12A which includes specifying the IP address of a transmission destination. In response to receiving the transmission request, the OS 12A obtains a MAC address associated with the specified IP address from the ARP table 14A, and has the communication unit transmit an ACK signal having the IP address and MAC address specified.

Also, the reception at Step S402 is executed after the communication unit of the backup server 10 has determined whether the received IP address and MAC address are matched with a combination stored in the ARP table 14A. Therefore, if the combination of the IP address and the MAC address is not one stored in the ARP table 14A, the backup server 10 does not receive the data (discards it from a data buffer or the like).

Thus, reception of backup data is completed by repeating Steps S402-S406. When the reception is completed, the backup application 12B ends the process of the flowchart (Step S408). The completion of the reception can be detected, for example, by receiving a completion indication signal from the client computer 30.

On the other hand, if it is determined at S404 that a time-out occurs, the backup application 12B obtains data stored in the ARP table 14A again (Step S410). Then, the backup application 12B compares the data obtained at Step S410 with the data obtained at Step S400 to determine whether the MAC address has been changed, which MAC address corresponds to the IP address of the client computer 30 transmitting backup data (Step S412).

If the MAC address has been changed, the backup application 12B issues a command for freezing the IP address on use for the client computer 30, which is transmitting the backup data, to the DHCP server 20 (Step S414).

With this process, if duplication of an IP address occurs when the client computer 40 makes a connection, the backup server 10 can have the client computer 30 obtain another IP address, as will be described later.

If the MAC address has not been changed, the backup application 12B determines that it is an error not to be processed here but by another error handling procedure (Step S416), and ends the flowchart.

[Process on DHCP Server 20]

Figure 7:
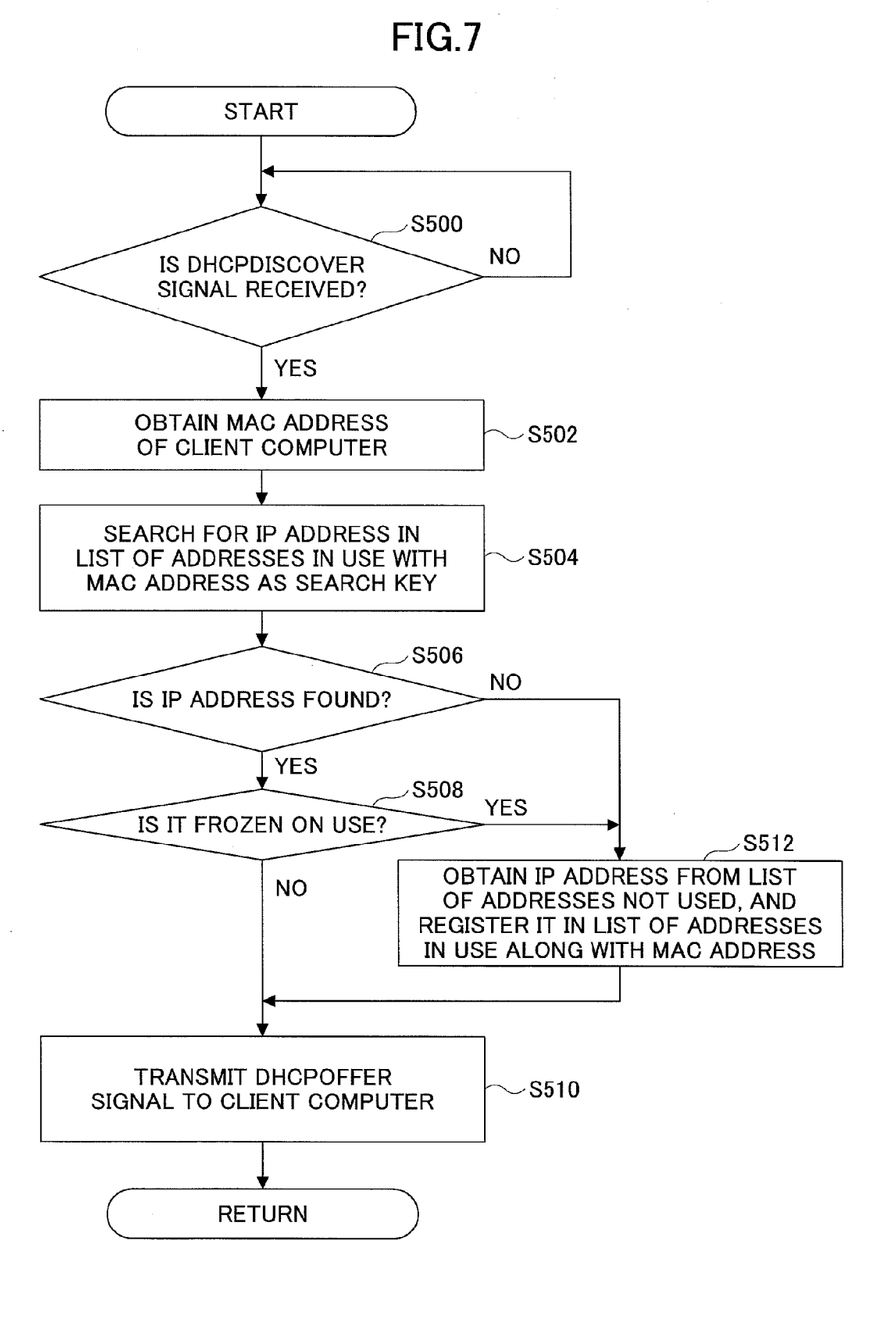
FIG. 7 is an example of a flowchart illustrating a process executed by a DHCP server 20.

FIG. 7 is an example of a flowchart illustrating a process executed by the DHCP server 20. The flowchart is repeatedly executed, for example, at predetermined cycles.

First, the DHCP server 20 waits for receiving a DHCP-DISCOVER signal from the client computer 30 that requests an assignment of an IP address (Step S500).

In response to receiving a DHCPDISCOVER signal, the DHCP server 20 obtains the MAC address of the requesting client computer 30 (Step S502). The MAC address is described, for example, in the header part of the DHCPDISCOVER signal.

Figure 8:
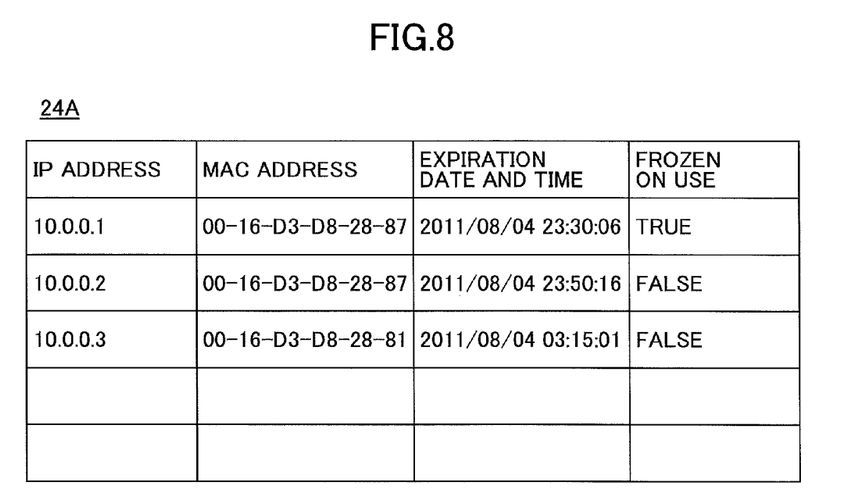
FIG. 8 is a schematic view illustrating an example of data stored as a list of addresses in use 24A.

Next, the DHCP server 20 searches for the IP address in the list of addresses in use 24A, using the MAC address obtained at Step S502 as a search key (Step S504). FIG. 8 is a schematic view illustrating an example of data stored as a list of addresses in use 24A. An "expiration date and time" in FIG. 8 may or may not be equivalent to the corresponding "update date and time" in the ARP table 14A (in the drawings of FIGS. 3 and 8, these are set to be equivalent). Also, the field of "frozen on use" in FIG. 8 designates whether the backup server 10 has issued a command for freezing on use where "TRUE" means that the IP address is frozen on use, whereas "FALSE" means that the IP address is not frozen on use.

Then, the DHCP server 20 determines whether an IP address associated with the MAC address is found in the list of addresses in use 24A (Step S506).

If an IP address associated with the MAC address is found in the list of addresses in use 24A, the DHCP server 20 determines whether the corresponding IP address is frozen on use (Step S508).

If the corresponding IP address is not frozen on use, the DHCP server 20 transmits a DHCPOFFER signal to the client computer 30 to indicate that the corresponding IP address is to be assigned (Step S510). Step S510 is executed immediately after the negative branch of Step S508 in a situation, for example, where the DHCP server 20 authenticates to allow continuous use of an IP address before and after an activation of the client computer 30.

Figure 9:
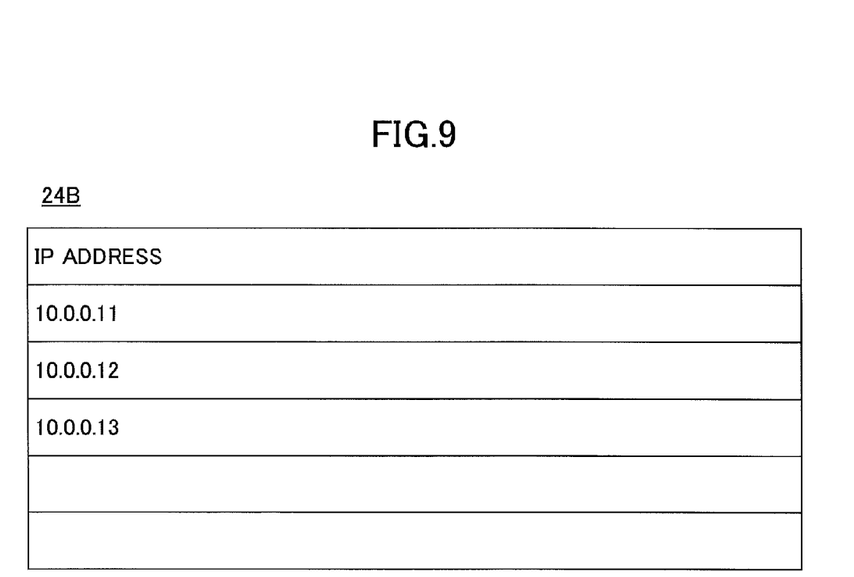
FIG. 9 is a schematic view illustrating an example of data stored as a list of addresses not used 24B.

On the other hand, if an IP address is not found at Step S506, the DHCP server 20 obtains an IP address from the list of addresses not used 24B, and registers the IP address in the list of addresses in use 24A along with the MAC address obtained at Step S502 (Step S512). Then, the DHCP server 20 transmits a DHCPOFFER signal to the client computer 30 (Step S510). FIG. 9 is a schematic view illustrating an example of data stored as a list of addresses not used 24B. Steps S512 and S510 are executed immediately after the negative branch of Step S506 in a situation, for example, where a new IP address is being assigned in response to receiving a DHCPDISCOVER signal from the client computer 30 whose IP address has been reset because the "expiration date and time" has come.

If it is determined at Step S508 that the corresponding IP address is frozen on use, the DHCP server 20 obtains an IP address from the list of addresses not used 24B, and registers the IP address in the list of addresses in use 24A along with the MAC address obtained at Step S502 (Step S512). Then, the DHCP server 20 transmits a DHCPOFFER signal to the client computer 30 (Step S510). Steps S512 and S510 are executed immediately after the positive branch of Step S508 in a situation, for example, where duplication of an IP address occurs when the client computer 40 is connected during transmission of backup data, as will be described later.

With this process, if duplication of an IP address occurs when the client computer 40 makes a connection, the DHCP server 20 can have the client computer 30 obtain another IP address, as will be described later.

[Overview]

With the processes as above, it is possible to resolve inconvenience that communication between the client computer 30 and the backup server 10 cannot be made when duplication of an IP address accidentally occurs with a connection of the client computer 40.

Figure 10:
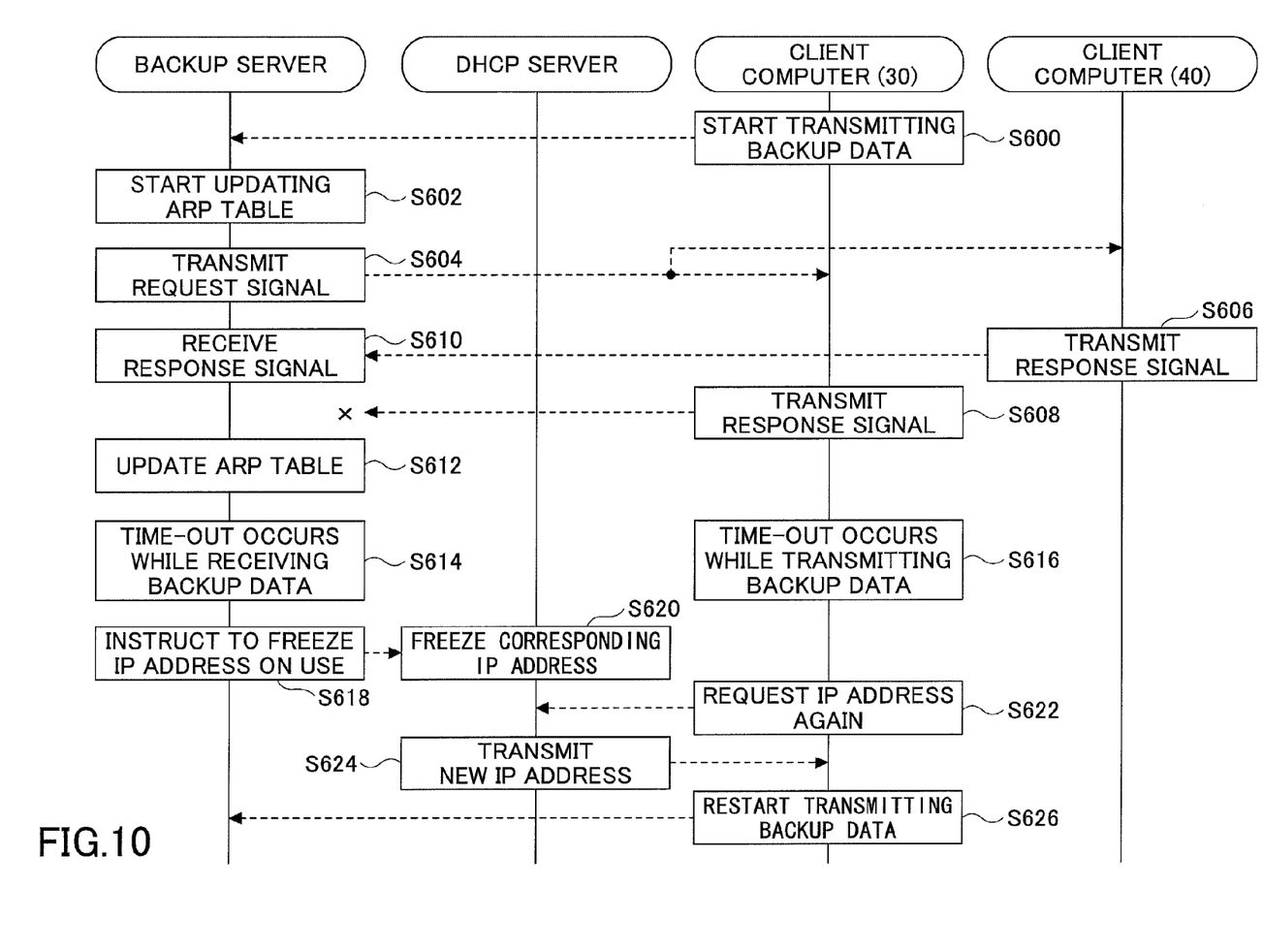
FIG. 10 is a schematic view illustrating an example of a sequence chart illustrating a process flow in a situation where an information processing system 1 in the present embodiment avoids duplication of an IP address.

The above inconvenience occurs in the following situation. FIG. 10 is a schematic view illustrating an example of a sequence chart illustrating a process flow in a situation where the information processing system 1 avoids duplication of an IP address according to the present embodiment.

First, the client computer 30 starts transmitting backup data (Step S600).

When the "update date and time" in the ARP table 14A comes for the IP address attached to the client computer 30 before the transmission of backup data ends, the backup server 10 starts updating the ARP table 14A (Step S602).

The backup server 10 transmits a request signal for requesting a reply of a MAC address to the client computers 30-40 (Step S604). At this moment, there is likelihood that the IP address is accidentally duplicated between the client computers 30 and 40 because the client computer 40 uses a fixed IP address for communication.

If the IP address is duplicated, the client computers 30-40 transmit response signals to the backup server 10, respectively (Steps S606 and S608). At this moment, the backup server 10 updates the ARP table 14A by picking up a first received response signal (Steps S610 and S612). Assume here that the response signal from the client computer 40 is picked up, and the response signal from the client computer 30 is discarded.

As a result of Steps S604-S612, a combination of the IP address and MAC address of the client computer 40 is stored in the ARP table 14A. Consequently, if the client computer 30 tries to transmit the backup data, the transmitted data is not received but discarded because a combination of its IP address and MAC address is not stored in the ARP table 14A. For such inconvenience, a countermeasure is not taken in a conventional system. Therefore, the process on the client computer 30 would stop, which requires manual intervention for fixing the problem.

On the other hand, in the information processing system 1 in the present embodiment, when a time-out occurs (Step S614), the backup server 10 issues a command for freezing the IP address on use to the DHCP server 20 (Step S618). In response to the freeze command, the DHCP server 20 freezes the corresponding IP address on use (Step S620).

When the time-out occurs while transmitting the backup data (Step S616), the client computer 30 makes a second request for an IP address to the DHCP server 20 (Step S622). In response to the second request of an IP address, the DHCP server 20 transmits a new IP address to the client computer 30 (Step S624). This makes the client computer 30 resume transmitting the backup data (Step S626).

Note that the client computer 30 may execute a delaying process to pause for a certain time so that the second request of an IP address at Step 622 comes after the IP address has been frozen at S620.

As described above, duplication of an IP address can be resolved in the information processing system 1 according to the present embodiment.

The embodiments have been described in detail above. Further, the present invention is not limited to these embodiments, but various variations and modifications may be made without departing from the scope of the present invention.

For example, the above embodiment describes a freeze command of an IP address that is based on change in the ARP table 14A while backup data is transmitted from the client computer 30 to the backup server 10, but it is not limited to that. A freeze command of an IP address may be issued based on change in the ARP table 14A while backed up data is transmitted from the backup server 10 to the client computer 30.

INDUSTRIAL USABILITY

The present invention can be used in the data management service industry, computer manufacturing industry, computer software industry, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A server apparatus comprising:
a memory; and
a processor coupled to the memory and the processor configured to
store, in the memory, table data including an IP address and a MAC address of at least one of a first information processing apparatus and a second information processing apparatus, which are connected to a network, the IP address and the MAC address being associated with each other in the table data, the first information processing apparatus that acquires the IP address from an IP address assignment apparatus for communication, the second information apparatus that uses a fixed IP address for the communication,
transmit information having the IP address stored in the memory, and update the table data based on information in a reply for the transmitted information,
determine whether the MAC address being associated with the IP address of the first information processing apparatus has been changed from the MAC address stored in the table data since a time-out when the time-out occurs while receiving or transmitting the information with the first information processing apparatus, and
issue a command for freezing the corresponding IP address on use to the IP address assignment apparatus connected to the network when the MAC address has been changed.

2. An information processing system comprising:
a first information processing apparatus that acquires an IP address from an IP address assignment apparatus for communication;
a second information processing apparatus that uses a fixed IP address for the communication; and
a server apparatus including
a memory, and
a processor coupled to the memory and the processor configured to
store, in the memory, table data including the IP address and a MAC address of at least one of the first information processing apparatus and the second information processing apparatus, the IP address and the MAC address being associated with each other in the table data,
transmit information having the IP address stored in the memory, and update the table data based on information in a reply for the transmitted information,
determine whether the MAC address being associated with the IP address of the first information processing apparatus has been changed from the MAC address stored in the table data since a time-out when the time-out occurs while receiving or transmitting the information with the first information processing apparatus, and
issue a command for freezing the corresponding IP address on use to the IP address assignment apparatus connected to the network when the MAC address has been changed,
wherein the first information processing apparatus is configured to transmit a request for an obtainment of another IP address to the IP address assignment apparatus when the time-out occurs while receiving or transmitting the information with the server apparatus;
wherein the IP address assignment apparatus is configured to assign the other IP address to the information processing apparatus requesting the obtainment of the other IP address, in response to receiving the request for the obtainment of the other IP address, and to avoid the other IP address being duplicated with the IP address having been frozen on use by the command.

3. The information processing system as claimed in claim 2, wherein the first information processing apparatus executes a delaying process so that the request of the obtainment of the other IP address to be transmitted to the IP address assignment apparatus comes after the IP address assignment apparatus has executed the command for freezing the IP address if the time-out occurs while receiving or transmitting the information with the server apparatus.

4. An address management method executed by a computer, the method comprising:
storing, in a memory, table data including an IP address and a MAC address of at least one of a first information processing apparatus and a second information processing apparatus, which are connected to a network, the IP address and the MAC address being associated with each other in the table data, the first information processing apparatus that acquires the IP address from an IP address assignment apparatus for communication, the second information apparatus that uses a fixed IP address for the communication,
transmitting information having the IP address stored in the memory, and updating the table data based on information in a reply for the transmitted information,
determining whether the MAC address being associated with the IP address of the first information processing apparatus has been changed from the MAC address stored in the table data since a time-out when the time-out occurs while receiving or transmitting the information with the first information processing apparatus, and
issuing a command for freezing the corresponding IP address on use to the IP address assignment apparatus connected to the network when the MAC address has been changed.

5. A non-transitory computer-readable recording medium having a program stored therein for causing a server apparatus to execute an address management process comprising:
storing, in a memory of the server apparatus, table data including an IP address and a MAC address of at least one of a first information processing apparatus and a second information processing apparatus, which are connected to a network, the IP address and the MAC address being associated with each other in the table data, the first information processing apparatus that acquires the IP address from an IP address assignment apparatus for communication, the second information apparatus that uses a fixed IP address for the communication,
transmitting information having the IP address stored in the memory, and updating the table data based on information in a reply for the transmitted information,
determining whether the MAC address being associated with the IP address of the first information processing apparatus has been changed from the MAC address stored in the table data since a time-out when the time-out occurs while receiving or transmitting the information with the first information processing apparatus, and
issuing a command for freezing the corresponding IP address on use to the IP address assignment apparatus connected to the network when the MAC address has been changed.

* * * * *